June 24, 1947.  J. B. TIEDEMANN  2,422,810
METHOD OF MAKING PROPELLER BLADES
Filed Jan. 6, 1944    2 Sheets-Sheet 1

Julius B. Tiedemann
INVENTOR.

BY Elwin A. Andrus
ATTORNEY

June 24, 1947.　　　　J. B. TIEDEMANN　　　　2,422,810
METHOD OF MAKING PROPELLER BLADES
Filed Jan. 6, 1944　　　2 Sheets-Sheet 2
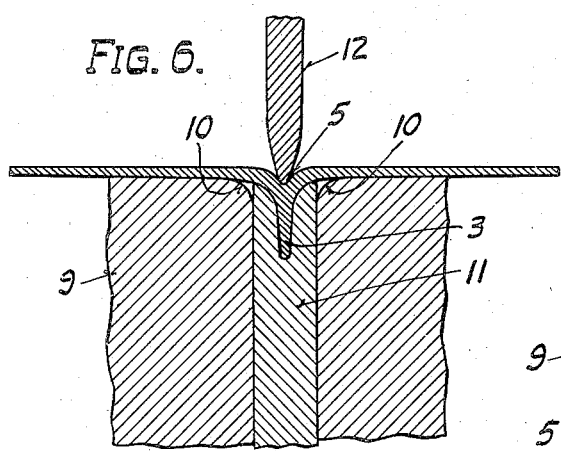
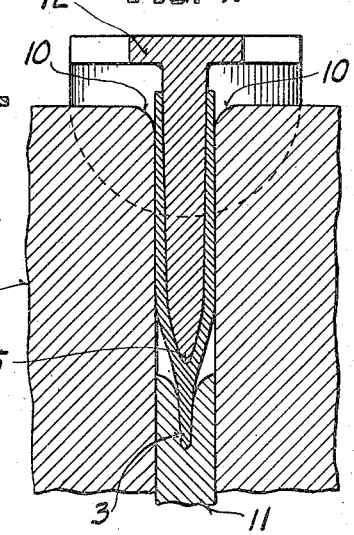
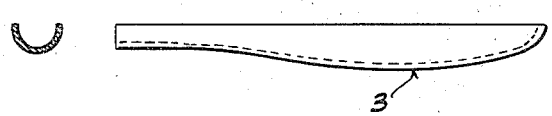
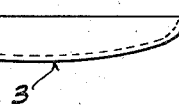
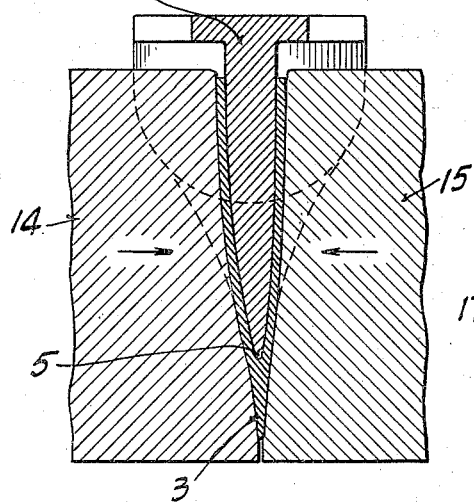
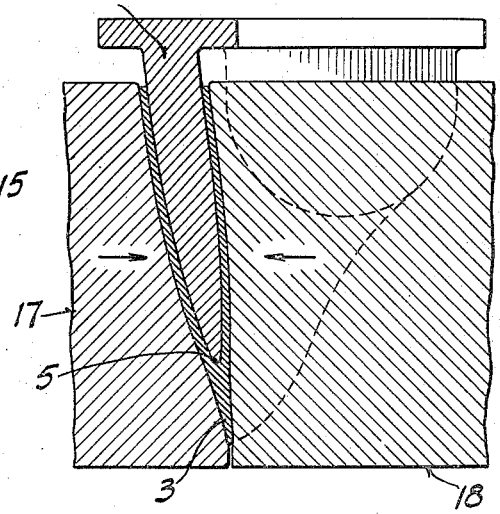
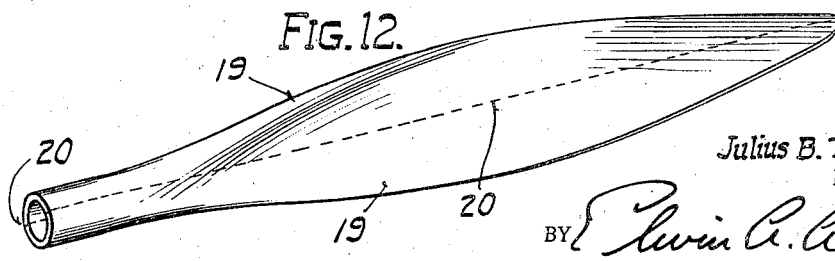
Julius B. Tiedemann
INVENTOR.
BY *Elwin A. Andrus*
ATTORNEY.

Patented June 24, 1947

2,422,810

UNITED STATES PATENT OFFICE 2,422,810

METHOD OF MAKING PROPELLER BLADES

Julius B. Tiedemann, Milwaukee, Wis., assignor To A. O. Smith Corporation, Milwaukee, Wis., a corporation of New York Application January 6, 1944, Serial No. 517,207

1 Claim. (Cl. 29—156.8)

This invention relates to a method of making propeller blades of the welded hollow steel type.

The invention has been applied in the manufacture of blade sections of two longitudinal halves welded together along longitudinal lines in the foil surface and is more particularly concerned with the forming of the separate leading and trailing edge sections of the blade.

The principal object of the invention is to provide a method of forming an edge section of the blade with a longitudinally tapered thickness, a heavy edge portion, varying width and with the twist of the blade.

A more specific object is to provide a method for forming an edge section with the blade twist.

Other objects and advantages of the invention will be set forth in the following description of a preferred manner of carrying out the invention illustrated in the drawings.

In the drawings:

Fig. 6 is a similar view showing the beginning of the folding operation;

Fig. 7 is a similar view showing the completion of the forming;

Fig. 8 is a transverse section through the shank showing the operation of Fig. 7;

Fig. 9 is a side elevation of the blade half after the forming operation of Figs. 7 and 8;

Fig. 10 is a central transverse section showing the side forming operation;

Fig. 11 is a similar view illustrating the final twisting of the blade section; and Fig. 12 is a perspective view of an assembled and welded blade.

Figure 1:
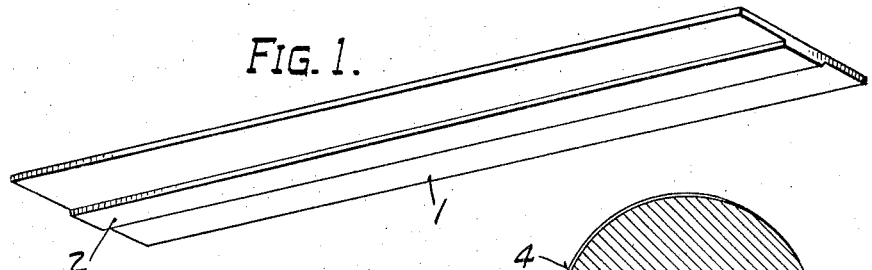
Figure 1 is a perspective view of a blank from which one half of the blade is made.
Figure 2:
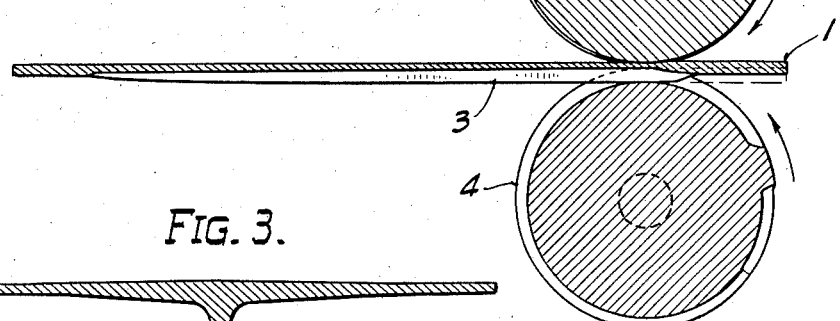
Fig. 2 is a side elevation showing the rolling of the blank to tapered thickness.
Figure 3:
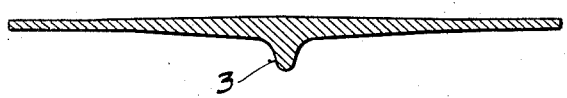
Fig. 3 is a central transverse section showing the cross-sectional shape of the body of the blank after rolling.
Figure 4:
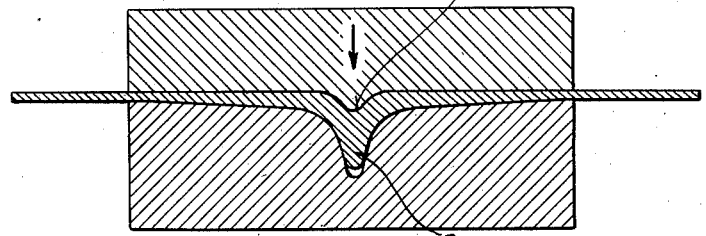
Fig. 4 is a similar section showing the forming of a channel behind the longitudinal bead.

In carrying out the invention, it is possible to start with either a blank of rectangular rolled plate of a thickness approximating that of the shank of the blade, or preferably, to start with a rolled plate 1 having a wide central longitudinal raised portion 2.

In the first rolling operation, the raised portion 2 is flattened out at the shank end of the blade and it is narrowed to the shape of a ridge 3 extending longitudinally of the body of the blank at approximately the center line. At the same time, the specially contoured rolls 4 taper the thickness of the body portion of the blank longitudinally to correspond with the desired tapered thickness of the same portions of the blade from a maximum thickness at the shank to a minimum thickness at the tip.

In the next operation either a press or a roll is employed to further shape the ridge 3 and to provide a channel 5 on its back side, which constitutes the inside of the finished blade. The location of the ridge 3 and channel 5 in the blank should correspond to either the leading or trailing edge of the finished blade and is preferably on the longitudinal center line of the blank so that when the latter is folded its side edges will extend along the center line of the foil surfaces of the blade.

Figure 5:
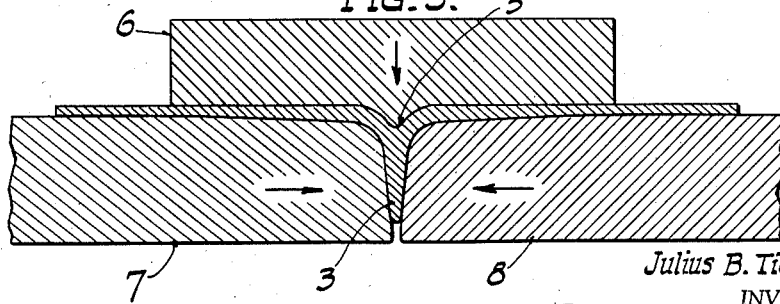
Fig. 5 is a similar view showing the final forming of the longitudinal bead.

The final forming of the ridge 3 is illustrated in Fig. 5 where, after punch 6 has been lower onto the blank, the lower supporting die members 7 and 8 are moved toward one another to extrude the ridge downwardly from the plane of the blank.

The folding of the blank is accomplished by a male and female die arrangement in which the blank is supported on the female die 9 having a longitudinal recess with upper corners 10 cut away on a large radius. A blank holder 11 extends upwardly in the die recess and has a groove for receiving the ridge 3 of the blank. The punch 12 has a blunt nose engaging in the channel 5 of the blank, and downward movement of the punch 12 forces the blank into the die recess as the blank holder 11 recedes. The sides of the blank are folded inwardly to vertical position following the side wall of the die recess.

In the shank end of the blank, there being no ridge 3 and channel 5, the die 9 and punch 12 are formed semi-circular and the blank holder 11 provides a part of the bottom of the die recess.

The formed blank has the shape shown in Fig. 9.

The blank is then placed on a fixed punch 13, and the sides are pressed inwardly by laterally movable dies 14 and 15, as illustrated in Fig. 10.

The blank is given the final twist of the blade by pressing it onto a fixed punch 16 embodying the blade twist and pressing the sides inwardly by laterally movable dies 17 and 18, as illustrated in Fig. 11. The removal of the blank from the twisted punch 16 can be effected by a longitudinal unthreading, the spiral nature of the twist and the tapered thickness of the punch making this possible.

The side edges of the blank are then sheared for welding to similar edges of a complementary blank 19 along the longitudinal center line of the blade. The welds 20, shown in Fig. 12, may be made by a fusion welding operation as set forth in the copending application of Warren F. Heineman, Serial No. 529,951, filed April 7, 1944, for Airplane propeller blade and method of making the same and assigned to the assignee of the present invention.

The invention may be employed in the forming of edge sections for other types of blade construction than that illustrated, it being possible to fabricate the blade of longitudinal parts welded together along transverse lines, one or more of the parts having sections formed as herein described.

Various modes of carrying out the invention may be employed within the scope of the accompanying claim.

I claim:

In the fabrication of hollow metal propeller blades from a plurality of parts including two or more longitudinally extending sections welded together along longitudinal seams in the respective foil surfaces of the blade, the method of forming an edge section comprising rolling a plate metal blank longitudinally to taper the same in thickness and provide a longitudinally extending ridge thereon near the center line of the body portion, forming said ridge to the dimensions of a final edge of the blade with a channel in the rear surface of the blank beneath the same, clamping said ridge between narrow die members in a direction normal to the blank with one of said die members constituting a punch fitting in the channel of the blank, drawing said blank between dies while thus clamped to fold the sides of the blank along said ridge to substantially V-shape, pressing the blank between laterally movable dies and upon an internal mandrel to bring the sides into air foil shape and provide the blade twist therein, and trimming the edges of the blank for welding.

JULIUS B. TIEDEMANN.

REFERENCES CITED

The following references are of record in the file of this patent:

UNITED STATES PATENTS

| Number | Name | Date |
| --- | --- | --- |
| 2,231,772 | Nelson | Feb. 11, 1941 |
| 1,988,202 | Hoover | Jan. 15, 1935 |
| 1,501,606 | Leitner | July 15, 1924 |